US010222791B2

(12) United States Patent
Kanada et al.

(10) Patent No.: US 10,222,791 B2
(45) Date of Patent: Mar. 5, 2019

(54) OPERATION ASSISTANCE APPARATUS AT TIME OF ACCIDENT IN PLANT

(71) Applicant: Hitachi, Ltd., Tokyo (JP)

(72) Inventors: Masaki Kanada, Tokyo (JP); Setsuo Arita, Tokyo (JP); Yoshihiko Ishii, Tokyo (JP); Kenichi Katono, Tokyo (JP); Tadaaki Ishikawa, Tokyo (JP); Ryota Kamoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 15/127,835

(22) PCT Filed: Apr. 4, 2014

(86) PCT No.: PCT/JP2014/059915
§ 371 (c)(1),
(2) Date: Sep. 21, 2016

(87) PCT Pub. No.: WO2015/151267
PCT Pub. Date: Oct. 8, 2015

(65) Prior Publication Data
US 2017/0097637 A1 Apr. 6, 2017

(51) Int. Cl.
*G05B 13/02* (2006.01)
*G05B 23/02* (2006.01)

(52) U.S. Cl.
CPC ......... *G05B 23/0278* (2013.01); *Y04S 10/522* (2013.01)

(58) Field of Classification Search
CPC .................... G05B 23/0278; Y04S 10/522
See application file for complete search history.

(56) References Cited

U.S. PATENT DOCUMENTS

| 4,318,778 A * | 3/1982 | Musick ............... G21D 3/04 376/216 |
| 5,198,185 A * | 3/1993 | Church ............... G21C 15/18 376/210 |
| 5,309,489 A * | 5/1994 | Tate .................. G21C 15/182 376/283 |

(Continued)

FOREIGN PATENT DOCUMENTS

| JP | 02-018197 A | 1/1990 |
| JP | 06-103481 A | 4/1994 |

(Continued)

OTHER PUBLICATIONS

International Search Report of PCT/JP2014/059915 dated Jun. 24, 2014.

*Primary Examiner* — Adam Lee
(74) *Attorney, Agent, or Firm* — Mattingly & Malur, PC

(57) ABSTRACT

An operator of a nuclear plant is provided with an action margin time up to the execution of a next action to be performed in response to a detected accident based on sensor signals received from sensors for the plant. The operator is provided with a displayed graph showing the received sensor signals, estimated sensor signals for the future, the action margin time and an action threshold value corresponding to the next action. Accordingly, the operator can readily grasp how much time is available to perform the next action before the received sensor signals are predicted to exceed the action threshold value.

2 Claims, 5 Drawing Sheets

(56) References Cited

U.S. PATENT DOCUMENTS

| | | | |
|---|---|---|---|
| 9,905,320 B2* | 2/2018 | Kim | G21C 15/18 |
| 2002/0101951 A1* | 8/2002 | Nakamaru | G21C 1/084 |
| | | | 376/282 |
| 2004/0086071 A1* | 5/2004 | Lee | G21C 17/00 |
| | | | 376/259 |
| 2009/0279657 A1* | 11/2009 | Kwon | G21C 15/18 |
| | | | 376/282 |
| 2011/0035693 A1* | 2/2011 | Ueno | G05B 23/0272 |
| | | | 715/771 |
| 2011/0158371 A1* | 6/2011 | Sato | G21C 1/086 |
| | | | 376/249 |
| 2011/0183303 A1* | 7/2011 | Yamamoto | G05B 17/02 |
| | | | 434/219 |
| 2012/0109618 A1* | 5/2012 | Tsai | G06Q 10/0639 |
| | | | 703/18 |
| 2012/0185295 A1* | 7/2012 | Yoon | G06Q 10/0635 |
| | | | 705/7.28 |
| 2012/0236980 A1* | 9/2012 | Redschlag | G21C 9/00 |
| | | | 376/298 |
| 2013/0109902 A1* | 5/2013 | Yamada | G21F 9/001 |
| | | | 588/6 |
| 2013/0272468 A1* | 10/2013 | Loewen | G21C 17/00 |
| | | | 376/247 |
| 2016/0195872 A1* | 7/2016 | Arita | G05B 23/0229 |
| | | | 700/44 |

FOREIGN PATENT DOCUMENTS

| | | |
|---|---|---|
| JP | 10-222222 A | 8/1998 |
| JP | 2003-005828 A | 1/2003 |
| JP | 2012-168799 A | 9/2012 |

* cited by examiner

[Fig. 1]
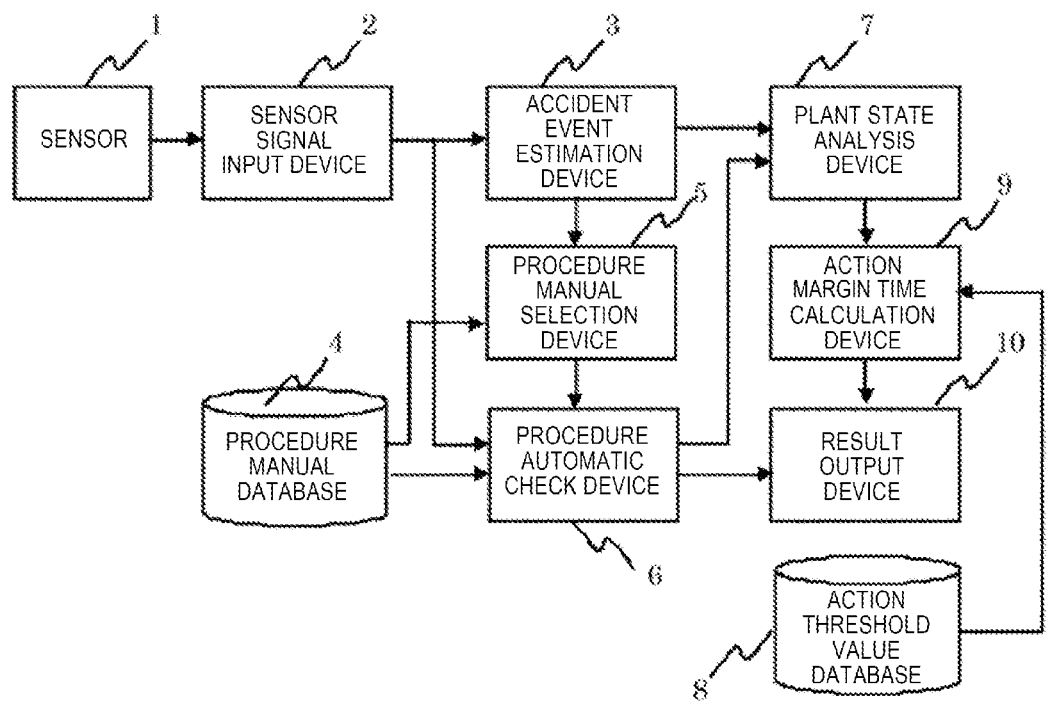
[Fig. 2]
| TIME | MAIN STEAM FLOW RATE (%) | TEMPERATURE IN CONTAINMENT VESSEL (°C) | PRESSURE IN CONTAINMENT VESSEL (kPa) | AMOUNT OF RADIATION IN CONTAINMENT VESSEL (Gy/hr) |
|---|---|---|---|---|
| -10:00 | 100 | 40 | 10 | 0.01 |
| : | : | : | : | : |
| -00:10 | 100 | 40 | 10 | 0.01 |
| 00:00 | 100 | 40 | 30 | 0.5 |
| 00:10 | 90 | 50 | 80 | 1.0 |
| 00:20 | 90 | 60 | 150 | 1.0 |
| 00:30 | 90 | 70 | 200 | 1.0 |
| 00:40 | 90 | 80 | 250 | 1.0 |
| 00:50 | 90 | 90 | 300 | 1.0 |
| 01:00 | 90 | 100 | 300 | 1.0 |
| : | : | : | : | : |

[Fig. 3]

| ACCIDENT EVENT | MAIN STEAM FLOW RATE | TEMPERATURE IN CONTAINMENT VESSEL | PRESSURE IN CONTAINMENT VESSEL | AMOUNT OF RADIATION IN CONTAINMENT VESSEL |
|---|---|---|---|---|
| MAIN STEAM PIPE BREAKAGE | DECREASE BY 10% OR MORE | EQUAL TO OR HIGHER THAN 60°C | EQUAL TO OR HIGHER THAN 100 KPA | EQUAL TO OR HIGHER THAN 0.1 GY/HR |
| LOSS IN WATER SUPPLY | DECREASE BY 10% OR MORE | LOWER THAN 60°C | LOWER THAN 100 KPA | — |
| SCRAM | LOWER THAN 30% | LOWER THAN 60°C | LOWER THAN 100 KPA | ≋ |
| ⋮ | ⋮ | ⋮ | ⋮ | ⋮ |

[Fig. 4]

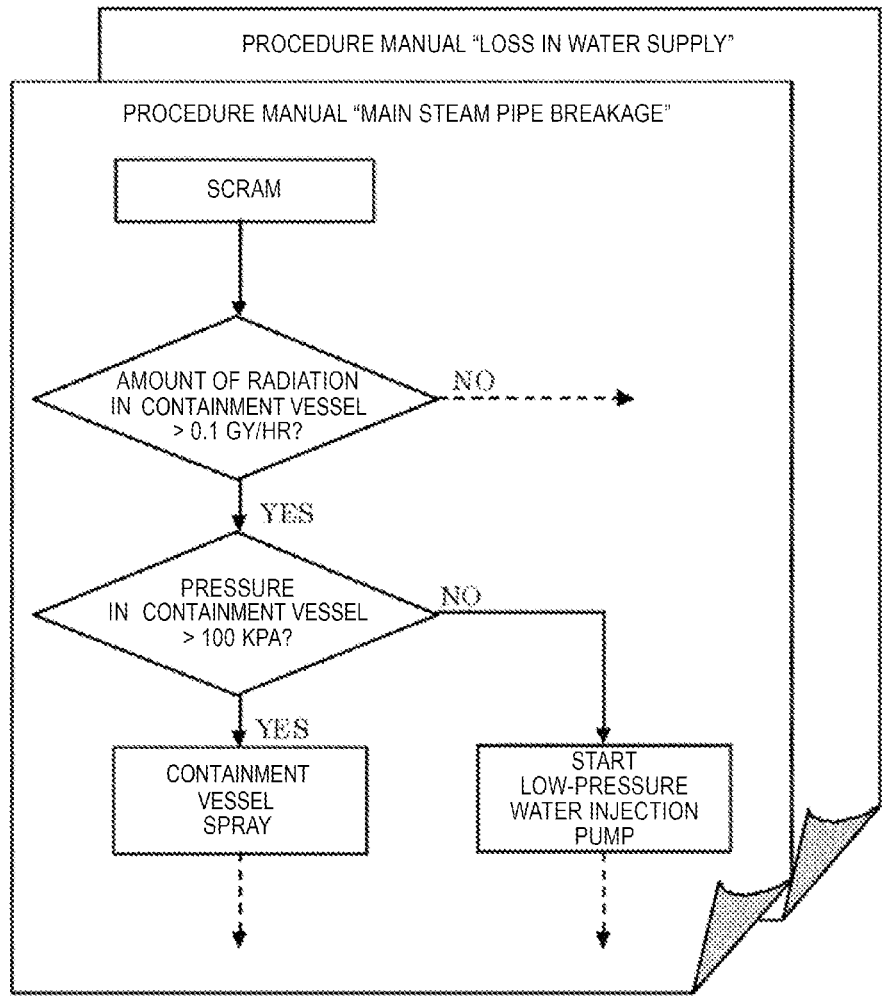

[Fig. 5]
| PROCEDURE MANUAL | ACTION | TEMPERATURE IN CONTAINMENT VESSEL | PRESSURE IN CONTAINMENT VESSEL |
|---|---|---|---|
| MAIN STEAM PIPE BREAKAGE | CONTAINMENT VESSEL SPRAY | ---- | EQUAL TO OR LOWER THAN 400 KPA |
| MAIN STEAM PIPE BREAKAGE | START LOW-PRESSURE WATER INJECTION PUMP | EQUAL TO OR LOWER THAN 100°C | ---- |
| LOSS IN WATER SUPPLY | START LOW-PRESSURE WATER INJECTION PUMP | EQUAL TO OR LOWER THAN 100°C | ---- |
| ⋮ | ⋮ | ⋮ | ⋮ |
[Fig. 6]
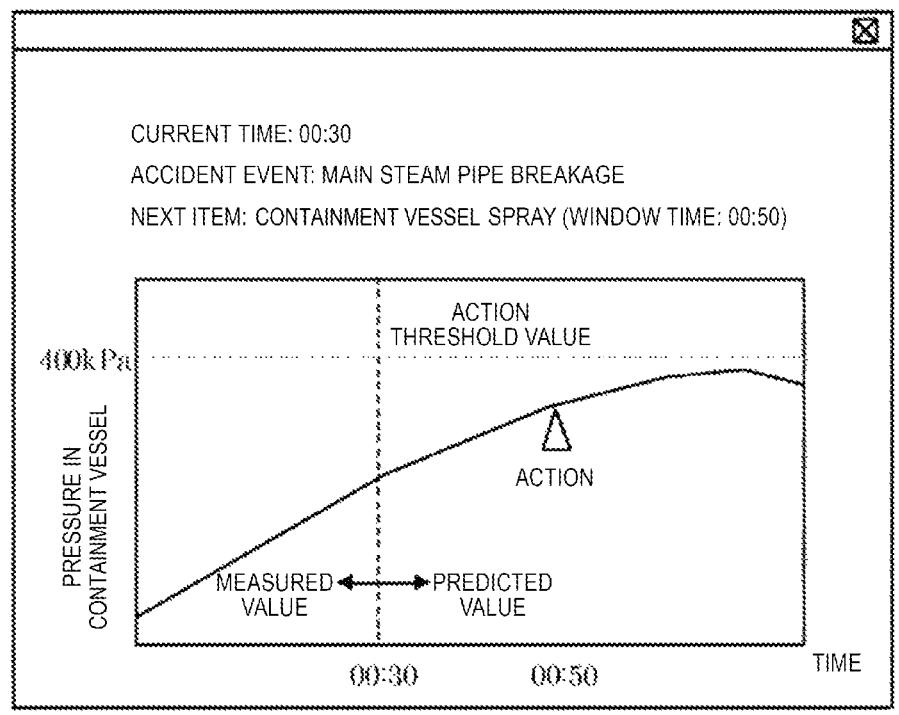

[Fig. 7]
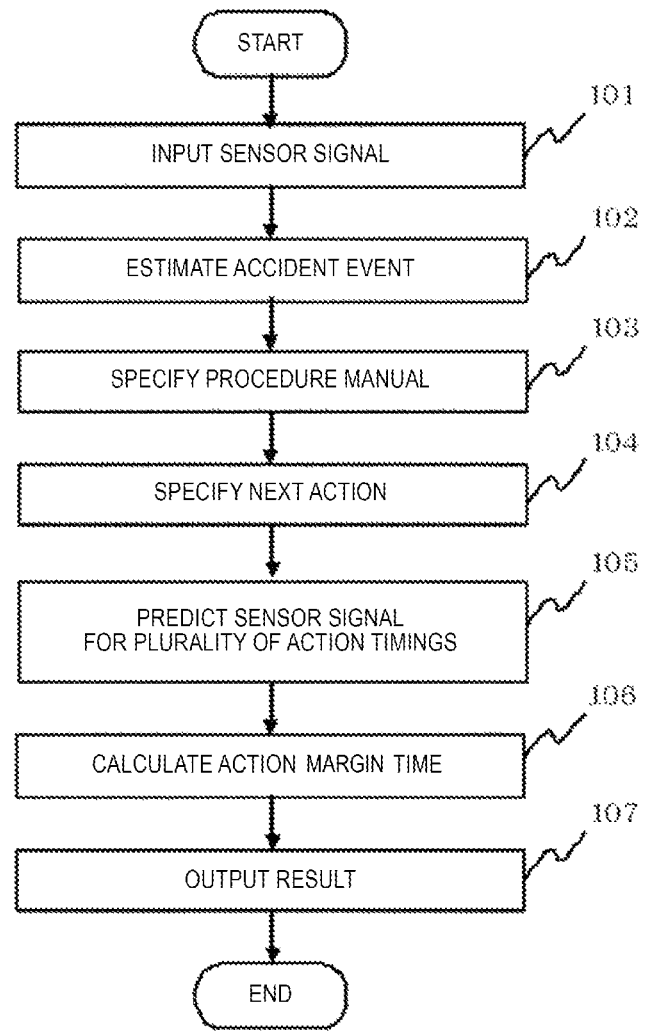

[Fig. 8]
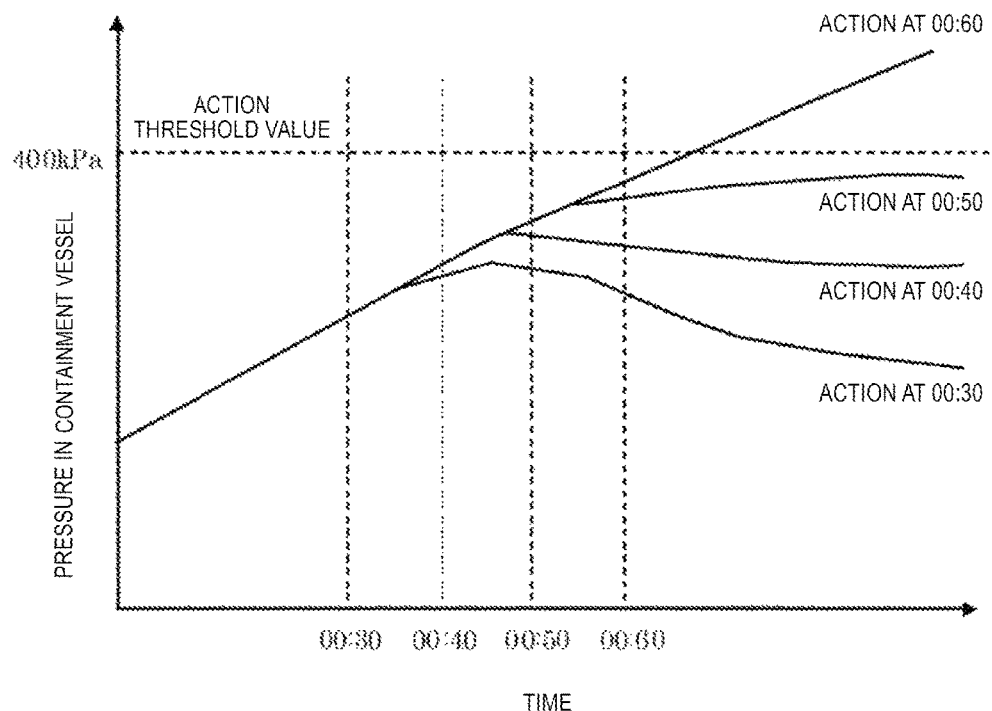

OPERATION ASSISTANCE APPARATUS AT TIME OF ACCIDENT IN PLANT

TECHNICAL FIELD

The present invention relates to an operation assistance apparatus at a time of an accident in a plant.

BACKGROUND ART

In a case where an accident occurs in a nuclear power plant, an operator performs an operation action based on an action procedure manual for an accident. At this time, it is important to estimate an accident event occurred in the plant based on sensor values or the like and ascertain a state of the plant. However, at the time of the accident, many alarms are working and there are many sensor values to be checked. Therefore, in this state, burden to the operator becomes very large. In this regard, computerization of the procedure manual and a method for automatically providing the relating parameter has been studied as a method for assisting the operator. Specifically, it is considered that diagnosing the state of the plant, providing procedures to be acted by the operator, and estimating the subsequent state of the plant is effective.

As a method for assisting the operator in the plant, JP-A-2003-5828 (PTL 1) is disclosed. In this application, "a plant operation assistance apparatus including an abnormal state database in which a range of parameters at the time of an abnormal state in a main body of the plant is recorded, an operation manual database in which action procedures to eliminate the abnormal state are recorded, a plant monitoring unit that collects the parameters from the main body of the plant, an abnormal state determination unit that determines whether or not the main body of the plant is in an abnormal state based on the collected parameters with reference to the abnormal state database, a countermeasure search unit that extracts the action procedure from the operation manual database when the main body of the plant is in the abnormal state, and a notification unit that notifies a terminal of the action procedure", is disclosed.

In addition, as a method for determining a method of treatment at the time when the plant is in the abnormal state, JP-A-6-103481 (PTL 2) is disclosed. In this application, "a plant operation monitoring system including a plant abnormality diagnosis unit that diagnoses an abnormality occurred in a plant using plant data input from the actual plant, an important process amount determination unit that is started to operate after the abnormality diagnosis by the plant abnormality diagnosis unit and determines process amounts such as a process amount which is mostly affected by the causes of the abnormality and a process amount to be monitored at the time of a recovery operation, an operation amount determination unit that inputs information on an operation guide from the plant abnormality diagnosis unit and selects the quantitative property of the operation guide, a model selection and determination unit that performs selection and determination of the optimal physical model in accordance with the abnormality occurred in the plant, a boundary condition file in which a boundary condition applied to the selected physical model is stored, and a prediction simulation unit that predicts a future state of the abnormality if the selected action is executed using the physical model selected by the model selection and determination unit and the boundary condition from the boundary condition file, is disclosed. In the plant operation monitoring system, the prediction simulation unit is caused to have functions of inputting a load demand-related signal from the plant at the time of a normal operation without any abnormality occurred in the plant, periodically calculating the model same to the physical model from the time of the normal operation, and creating an initial value for the prediction model".

CITATION LIST

Patent Literature

PTL 1: JP-A-2003-5828
PTL 2: JP-A-6-103481

SUMMARY OF INVENTION

Technical Problem

In the methods disclosed in PTL 1 and PTL 2, a procedure for an operator to act at the time of an accident in a plant is provided and a state of the plant after the action can be predicted. However, in any methods described above, a method for providing a margin time which means until what time the action has to be executed is not disclosed. At the time of the accident in the plant, the operator does not have enough time, and thus, providing the margin time is important. For example, in a case where the operator does not have enough time, the margin time will be helpful in determining whether or not to input more persons relating to the action and whether or not to execute another measure.

Therefore, an object of the present invention is to provide the operator with a margin time up to the execution of an action when an accident occurs in the nuclear power plant.

Solution to Problem

The an operation assistance apparatus of present invention includes: a sensor signal input device that inputs a sensor signal; an accident event estimation device that estimates an accident event in a plant from the sensor signal; a procedure manual database in which procedure manuals for the accident are stored; a procedure manual selection device that determines a procedure manual that will be referred to from the procedure manual database based on the accident event; a procedure automatic check device that checks items in the procedure manual and determines a next action using the sensor signal; a plant state analysis device that analyzes a state of the plant in a case where the actions are executed at a plurality of action timings based on the accident event and the next action, and calculates predicted values of the sensor signals; an action threshold value database in which an action threshold values of the sensor signals corresponding to the action procedure at the time of the accident are stored; and an action margin time calculation device that determines whether or not a predicted value of the sensor signal reaches the action threshold value and calculates the action margin time up to the execution of the action.

Advantageous Effects of Invention

According to the present invention, it is possible to provide a margin time up to the execution of the action for the operator when an accident occurs in the nuclear power plant.

BRIEF DESCRIPTION OF DRAWINGS

FIG. 1 is an example of a configuration of an operation assistance apparatus at the time of an accident in a plant.

FIG. 2 is an example of sensor signals.

FIG. 3 is a diagram for describing an accident event estimation device.

FIG. 4 is an example of a procedure manual database.

FIG. 5 is an example of an action threshold value database.

FIG. 6 is an example of a result output screen.

FIG. 7 is an example of a flow chart for processing by the operation assistance apparatus at the time of an accident in the plant.

FIG. 8 is a diagram for describing the calculation of an action margin time.

DESCRIPTION OF EMBODIMENTS

Hereinafter, an embodiment will be described using the drawings.

Embodiment 1

FIG. 1 is an example of a configuration of an operation assistance apparatus at the time of an accident in a plant.

A sensor 1 is a sensor that measures a temperature, a pressure, a water level, a water flow, and radiation of the plant.

A sensor signal input device 2 is a device that inputs a measurement values (sensor signal) measured by the sensor 1 to a computer. For example, a process computer may be used as the sensor signal input device.

Examples of the sensor signals are illustrated in FIG. 2. In the present embodiment, a main steam flow rate, temperature in a containment vessel, a pressure in the containment vessel, an amount of radiation in the containment vessel are exemplified as the sensor signal for the description. In addition, it is assumed that the accident occurring time is 00:00.

To an accident event estimation device 3, the sensor signal is input from the sensor signal input device 2, and the device estimates an accident event using each sensor signal value. For example, the accident event is estimated using a relationship between the accident event and the sensor signal value illustrated in FIG. 3. In the example of the sensor signals in FIG. 2, a condition for a main steam pipe breakage is satisfied at 00:20 and the accident event "main steam pipe breakage" is estimated to occur.

In a procedure manual database 4, action procedures at the time of an accident are stored. An example of the procedure manual database 4 is illustrated in FIG. 4. The procedure manual is prepared for each of the accident events occurred. A procedure manual for a case where the event is not specified yet may be prepared. The procedure manual in FIG. 4 is an example for describing the embodiment, and an actual procedure manual is different from that in FIG. 4.

To a procedure manual selection device 5, the accident event is input from the accident event estimation device 3 and the action procedures are input from the procedure manual database 4, and the device 5 determines a procedure manual that will be referred to. Alternately, a function may be prepared in which candidates for the procedure manual that will be referred to are provided and the operator selects a procedure manual from the candidates. For example, in a case where an accident event "main steam pipe breakage" occurs, the procedure manual "main steam pipe breakage" is selected as a procedure manual that will be referred to.

To a procedure automatic check device 6, the sensor signal is input from the sensor signal input device 2, the action procedure is input from the procedure manual database 4, and the procedure manual that will be referred to is input from the procedure manual selection device 5. Items in the procedure manual that will be referred to are checked referring to the sensor signals, and in a case where it can be checked, then checking proceeds to the next item. In a case where the next item is an action item, the action is specified as a next action to be executed.

A plant state analysis device 7 is a plant simulator. To the plant state analysis device 7, the accident event is input from the accident event estimation device 3 and the next action to be executed is input from the procedure automatic check device 6, and the device 7 analyzes the state of the plant in a case of assuming that the action is executed, and calculates predicted values of the sensor signals. At this time, a plurality of timings is set at which the action is assumed to be executed, and the predicted values of the sensor signals for a plurality of action timings are calculated.

In an action threshold value database 8, action threshold values of the sensor signals corresponding to the action procedure at the time of an accident are stored. An example of the action threshold value database 8 is illustrated in FIG. 5. For example, an action "containment vessel spray" in the procedure manual "main steam pipe breakage" is executed as a goal for maintaining the pressure in the containment vessel be equal to or lower than 400 kPa. That is, it is necessary to execute the action before the pressure exceeds 400 kPa. The action threshold values in FIG. 5 are examples for describing the embodiment, and are different from actual action threshold values.

To an action margin time calculation device 9, the predicted values of the sensor signal relating to the plurality of action timings are input from the plant state analysis device 7 and the action threshold values are input from the action threshold value database 8. Whether or not the predicted value of the sensor signal at each action timing reaches the action threshold value is determined, and the longest time in which the predicted value does not reach the threshold value (the latest time) is set as the action margin time.

A result output device 10 displays the next action to be executed which is specified by the procedure automatic check device 6 and the action margin time calculated by the action margin time calculation device 9 on a display or the like. An example of the output screen is illustrated in FIG. 6.

The accident event estimation device 3, the procedure manual selection device 5, the procedure automatic check device 6, the plant state analysis device 7, and the action margin time calculation device 9 may be executed as programs in a computer. In addition, a configuration may be provided in such a manner that the procedure manual database 4 and the action threshold value database 8 are included in the computer.

FIG. 7 is an example of a flow chart for processing by the operation assistance apparatus at the time of an accident in the plant.

In STEP 101, the sensor signal input device 2 inputs the sensor signal measured by the sensor 1.

In STEP 102, the accident event estimation device 3 estimates the accident event using the sensor signal. For example, in a case of using the sensor signals in FIG. 2 and the table in FIG. 3, the accident event "main steam pipe breakage" at 00:20 is specified.

In STEP 103, the procedure manual selection device 5 specifies the procedure manual. For example, the procedure manual "main steam pipe breakage" is selected with respect to the occurred accident event "main steam pipe breakage".

In STEP 104, the procedure automatic check device 6 specifies the next action. For example, with regard to the procedure manual "main steam pipe breakage" in FIG. 4, at the time 00:20 when the procedure manual is selected, since an item "amount of radiation in the containment vessel >0.1 Gy/hr" and next item "pressure in the containment vessel >100 kPa" are satisfied, the next action is specified as "containment vessel spray". Since actually a certain time is required for this processing, for example, the next action is specified at the time 00:21.

In STEP 105, the plant state analysis device 7 predicts the sensor signals for a plurality of action timings.
Specifically, the predictions are performed for the cases of executing the action "containment vessel spray" at the times 00:30, 00:40, 00:50, and 00:60. This processing ends at, for example, 00:30. The result of prediction is illustrated in FIG. 8.

In STEP 106, the action margin time calculation device 9 calculates the action margin time. In the example in FIG. 5, the threshold value for the action "containment vessel spray" in the procedure manual "main steam pipe breakage" is set as 400 kPa for the pressure in the containment vessel. As a result of calculation in FIG. 8, in a case where the action "containment vessel spray" is executed at the times 00:30, 00:40, and 00:50, the pressure in the containment vessel does not reach 400 kPa. However, in a case of executing at the time 00:60, the pressure in the containment vessel exceeds 400 kPa. Therefore, the action margin time is calculated as 00:50.

In STEP 107, the next action to be executed "containment vessel spray" and the action margin time 00:50 are displayed on the result output device 10.

The procedures in STEP 101 and 102 is executed until the accident event occurs and is estimated at each time the sensor signal is input (for example, every 1 second).

Using the procedure described above, when an accident occurs in the nuclear power plant, it is possible to provide the operator with the action procedure, to predict the future sensor values after the execution of the action, and to provide the margin time up to the execution of an action.

The present invention is not limited to the embodiment described above, and various modification examples can be included therein. For example, the above-described embodiment is described in detail for an easy understanding of the present invention, and is not limited to the embodiment necessarily including all the described configurations. In addition, all or a part of each configuration, function, or the like described above may be realized by, for example, designing an integrated circuit, or the like. In addition, each configuration, function, or the like described above may be realized by a processor interpreting and executing a program that realizes each of the function, that is, by software.

REFERENCE SIGNS LIST

1 sensor
2 sensor signal input device
3 accident event estimation device
4 procedure manual database
5 procedure manual selection device
6 procedure automatic check device
7 plant state analysis device
8 action threshold value database
9 action margin time calculation device
10 result output device

The invention claimed is:

1. An operation assistance apparatus in a plant comprising:
a sensor signal input device configured to receive a plurality of sensor signals corresponding to a plurality of characteristics of the plant measured by a plurality of sensors, the characteristics including a main steam flow rate in the plant, a temperature in a containment vessel in the plant, a pressure in the containment vessel, and a radiation amount in the containment vessel;
a storage device configured to:
store a procedure manual database including one or more procedure manuals, each procedure manual including a plurality of actions, and
store a plurality of predetermined action threshold values corresponding to the actions;
a result output device; and
a processor programmed to:
estimate an accident event in the plant from the sensor signals,
select a procedure manual from the procedure manual database based on the estimated accident event,
determine that one or more items in the selected procedure manual are satisfied by the sensor signals,
determine an action from the plurality of actions in the selected procedure manual based on the one or more satisfied items in the selected procedure manual,
calculate a plurality of predicted values of the sensor signals corresponding to a future execution of the action at a plurality of timings in the future,
calculate an action margin time which is a last one of the timings at which the action can be executed in the future before the predicted values reach the predetermined action threshold value corresponding to the action, and
display, on the result output device, a current time, the action, the estimated accident event, and a graph relating the received sensor signals, the predicted values of the sensor signals at each of the plurality of timings up until the action margin time, the current time, the plurality of timings, the action margin time, and the predetermined action threshold value corresponding to the action, wherein based on the display an operator of the plant executes the action at or before the action margin time, and wherein the action adjusts at least one of the characteristics of the plant to be equal to or lower than the predetermined action threshold value.

2. The operation assistance apparatus according to claim 1,
wherein the action margin time is the latest time of executing the action at which the predicted values of the sensor signals do not reach the predetermined action threshold value.

* * * * *